(12) United States Patent
Naruse

(10) Patent No.: US 9,158,478 B2
(45) Date of Patent: Oct. 13, 2015

(54) STORAGE SYSTEM AND STORAGE CONTROL METHOD

(71) Applicant: FUJITSU LIMITED, Kawasaki-shi, Kanagawa (JP)

(72) Inventor: Meiu Naruse, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 217 days.

(21) Appl. No.: 13/932,082

(22) Filed: Jul. 1, 2013

(65) Prior Publication Data

US 2014/0059294 A1   Feb. 27, 2014

(30) Foreign Application Priority Data

Aug. 22, 2012   (JP) ................ 2012-183384

(51) Int. Cl.
*G06F 12/00* (2006.01)
*G06F 3/06* (2006.01)
*G06F 12/02* (2006.01)

(52) U.S. Cl.
CPC ............ *G06F 3/0689* (2013.01); *G06F 3/061* (2013.01); *G06F 3/0611* (2013.01); *G06F 3/0641* (2013.01); *G06F 3/0647* (2013.01); *G06F 3/0659* (2013.01); *G06F 3/0662* (2013.01); *G06F 3/0664* (2013.01); *G06F 3/0685* (2013.01); *G06F 12/02* (2013.01)

(58) Field of Classification Search
CPC ..... G06F 12/02; G06F 3/0611; G06F 3/0641; G06F 3/0662; G06F 3/0685; G06F 3/0689
See application file for complete search history.

(56) References Cited

U.S. PATENT DOCUMENTS

| 2008/0005508 | A1  | 1/2008  | Asano et al. |
| 2011/0035548 | A1* | 2/2011  | Kimmel et al. ............. 711/114 |
| 2011/0314205 | A1  | 12/2011 | Nagata |
| 2012/0079188 | A1* | 3/2012  | Hayashi ................. 711/114 |

FOREIGN PATENT DOCUMENTS

| JP | 10-40170      | 2/1998 |
| JP | 2008-15623    | 1/2008 |
| JP | 2010-191672   | 9/2010 |
| JP | 2010-218194   | 9/2010 |
| JP | 2011-515727   | 5/2011 |
| WO | WO-2009/102425 | 8/2009 |

* cited by examiner

*Primary Examiner* — Shawn X Gu
(74) *Attorney, Agent, or Firm* — Fujitsu Patent Center

(57) ABSTRACT

When a request to write data to a logical storage area realized by a storage area of a first storage apparatus is made in a storage system, a determination section determines whether a write pattern is sequential access or random access. When the write pattern is the sequential access, a control section writes the data to the logical storage area. On the other hand, when the write pattern is the random access, the control section writes the data to a virtual storage area obtained by virtualizing a storage area of a second storage apparatus which is faster in access speed than the first storage apparatus.

18 Claims, 19 Drawing Sheets

DATA TRANSFER BETWEEN SSDVOL AND NLVOL

DATA TRANSFER BETWEEN SSDVOL AND NLVOL

142 STORAGE LOCATION MANAGEMENT TABLE

| LBA | SSD STORAGE FLAG | HS STORAGE FLAG | NL STORAGE FLAG |
|---|---|---|---|
| 00000000 | 1 | 1 | 0 |
| 00000001 | 1 | 1 | 0 |
| 00000002 | 0 | 0 | 1 |
| 00000003 | 0 | 0 | 1 |
| 00000004 | 0 | 0 | 1 |
| 00000005 | 1 | 1 | 0 |
| 00000006 | 0 | 0 | 0 |
| 00000007 | 0 | 0 | 0 |
| 00000008 | 1 | 0 | 1 |
| 00000009 | 1 | 0 | 1 |
| ... | ... | ... | ... |

FIG. 12

143 STATE MANAGEMENT TABLE

| TRACK NUMBER | SSD STORAGE RATIO [%] | SSD ACCESS FREQUENCY | NL ACCESS FREQUENCY |
|---|---|---|---|
| 00000000 | 0 | – | 0 |
| 00000001 | 0 | – | 0 |
| 00000002 | 50 | 2 | 1 |
| 00000003 | 20 | 2 | 1 |
| 00000004 | 0 | – | 10 |
| 00000005 | 0 | – | 10 |
| 00000006 | 0 | – | 10 |
| 00000007 | 30 | 10 | – |
| ... | ... | ... | ... |

FIG. 13

144 VIRTUAL AREA MANAGEMENT TABLE

| LBA(NLVOL) | PHYSICAL ADDRESS (SSD) |
|---|---|
| 00000000 | 00010000 |
| 00000001 | 00010001 |
| 00000002 | – |
| 00000003 | – |
| 00000004 | – |
| 00000005 | 00010002 |
| 00000006 | – |
| 00000007 | – |
| ... | ... |

STORAGE SYSTEM AND STORAGE CONTROL METHOD

CROSS-REFERENCE TO RELATED APPLICATION

This application is based upon and claims the benefit of priority of the prior Japanese Patent Application No. 2012-183384, filed on Aug. 22, 2012, the entire contents of which are incorporated herein by reference.

FIELD

The embodiments discussed herein are related to a storage system and a storage control method.

BACKGROUND

HDDs (Hard Disk Drives) are widely used as comparatively large-capacity storage units. In particular, HDDs referred to as near line disks are slow in access speed, but they are known to be low in price per data capacity. In recent years, on the other hand, SSDs (Solid State Drives) have spread as another type of storage unit. An SSD is higher in price per data capacity than an HDD, but the random access performance of an SSD in particular is higher than that of an HDD.

Various uses for an SSD having such high performance are discussed. For example, there is a system which uses an SSD as a cache shared by a plurality of HDDs. Furthermore, there is a system in which data is selectively written to an HDD or an SSD according to an access characteristic, that is to say, according to whether access is sequential access or random access.

Japanese Laid-open Patent Publication No. 2010-191672
Japanese Laid-open Patent Publication No. 2008-015623
Japanese National Publication of International Patent Application No. 2011-515727

By the way, with many storage systems a RAID (Redundant Arrays of Inexpensive Disks) technique is used for exercising recording control. For example, data is stored in two or more storage units for realizing redundancy. In particular, a storage system controlled by using RAID-4, RAID-5, RAID-6, or the like as a RAID level includes many storage units. As a result, large storage capacity is needed.

With a storage system using the RAID technique, on the other hand, either of an HDD and an SSD can be used as a storage unit. Access speed can be increased by using an SSD. However, this needs a large-capacity storage area by the use of an SSD, and so increases the costs of the storage system.

SUMMARY

According to an embodiment, there is provided a storage system including a first storage apparatus, a second storage apparatus which is faster in access speed than the first storage apparatus, and a storage control apparatus which controls writing data to a logical storage area realized by a storage area of the first storage apparatus, the storage control apparatus determining, at the time of a request to write data to the logical storage area being made, whether a write pattern is sequential access or random access, writing the data to the logical storage area at the time of the write pattern being the sequential access, and writing the data to a virtual storage area obtained by virtualizing a storage area of the second storage apparatus at the time of the write pattern being the random access.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is an example of data registered in a state management table;
FIG. 13 is an example of data registered in a virtual area management table.

DESCRIPTION OF EMBODIMENTS

Figure 1:
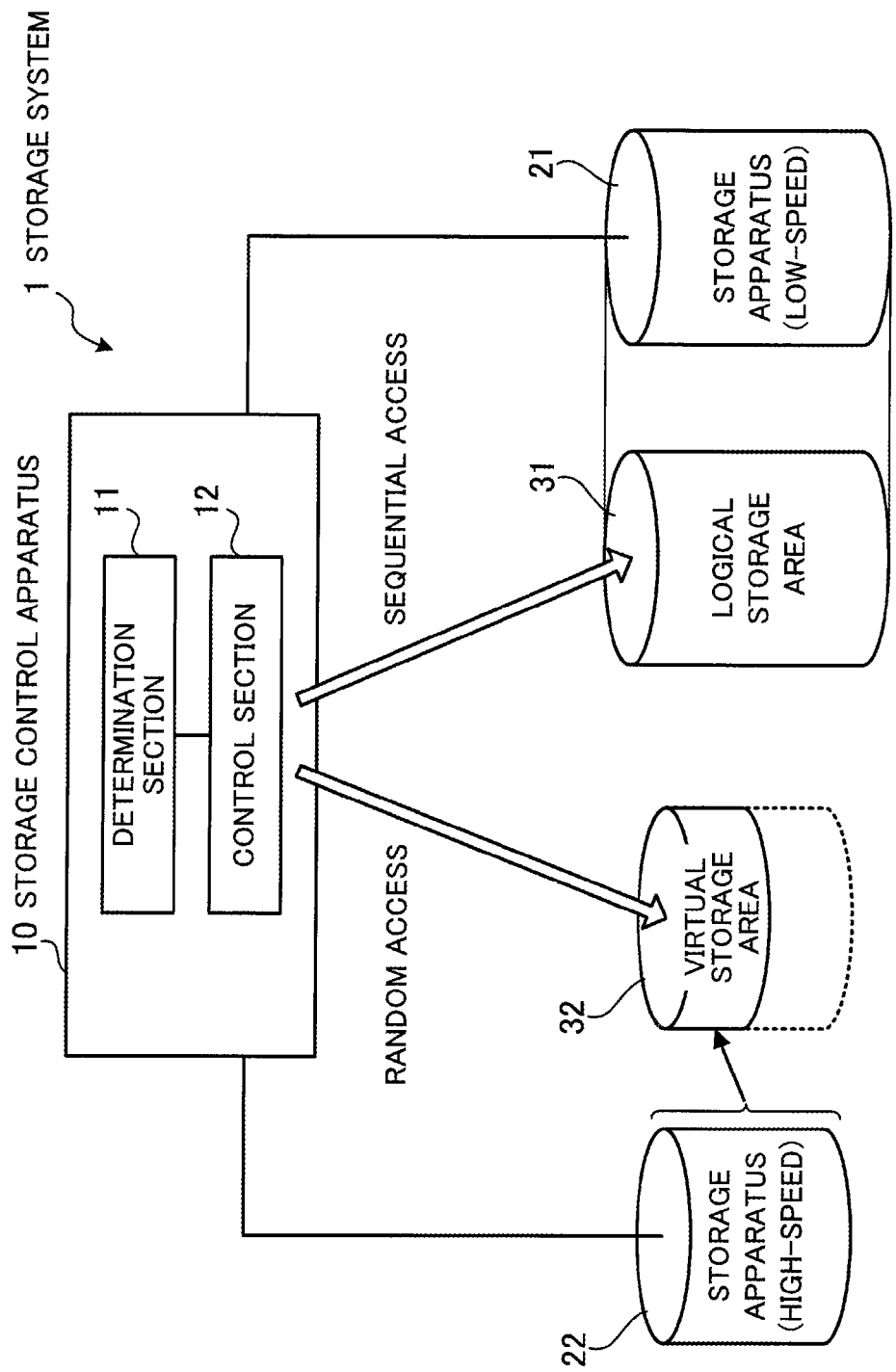
FIG. 1 is an example of the configuration and operation of a storage system according to a first embodiment.

Embodiments will now be described with reference to the accompanying drawings, wherein like reference numerals refer to like elements throughout.

First Embodiment

FIG. 1 is an example of the configuration and operation of a storage system according to a first embodiment. A storage system 1 includes a storage control apparatus 10, one or more storage apparatus 21 (first storage apparatus), and a storage apparatus 22 (second storage apparatus) the access performance of which is higher than that of the storage apparatus 21.

The storage control apparatus 10 accepts a request to access a logical storage area 31 realized by a storage area of the one or more storage apparatus 21, and controls reading data from or writing data to the logical storage area 31. If the logical storage area 31 is realized by storage areas of the plurality of storage apparatus 21, then the storage control apparatus 10 controls, for example, writing data to the logical storage area 31 so that the data will be stored in different storage apparatus 21 for realizing redundancy. For example, the storage control apparatus 10 uses a RAID technique, such as RAID-1, RAID-4, RAID-5, RAID-6, or RAID-(1+0), for controlling reading data from or writing data to the logical storage area 31.

As stated above, the storage apparatus 22 is faster in access speed than the storage apparatus 21. For example, if each storage apparatus 21 is an HDD, then an SSD can be used as the storage apparatus 22. The storage apparatus 22 is higher in price per capacity than the storage apparatus 21.

The storage control apparatus 10 generates a virtual storage area 32 by virtualizing a storage area of the storage apparatus 22, and controls reading data from or writing data to the virtual storage area 32. For example, the storage control apparatus 10 can allocate a free storage area of the storage apparatus 22 to the virtual storage area 32 at any time by a necessary amount.

The storage control apparatus 10 includes a determination section 11 and a control section 12. For example, a processor included in the storage control apparatus 10 executes a determined program. By doing so, a process by each of the determination section 11 and the control section 12 is realized.

When a request to write data to the logical storage area 31 is made, the determination section 11 determines whether a write pattern is sequential access or random access.

If the determination section 11 determines that a write pattern is sequential access, then the control section 12 write the data to the logical storage area 31. In this case, the control section 12 write the data to at least one storage apparatus 21.

On the other hand, if the determination section 11 determines that a write pattern is random access, then the control section 12 write the data to the virtual storage area 32. As a result, time taken to write the data is reduced compared with a case where the data is written to the logical storage area 31. That is to say, writing performance as a whole improves.

As has been described, the storage control apparatus 10 writes data at the time of random access to the virtual storage area 32 generated by virtualizing a storage area of the storage apparatus 22 which has high access performance and which is high in cost per capacity. Accordingly, there is no need to prepare the storage apparatus 22 which is equal in capacity to the logical storage area 31 as a data write destination at the time of random access. As a result, the storage control apparatus 10 can improve access performance at a low cost.

Second Embodiment

Figure 2:
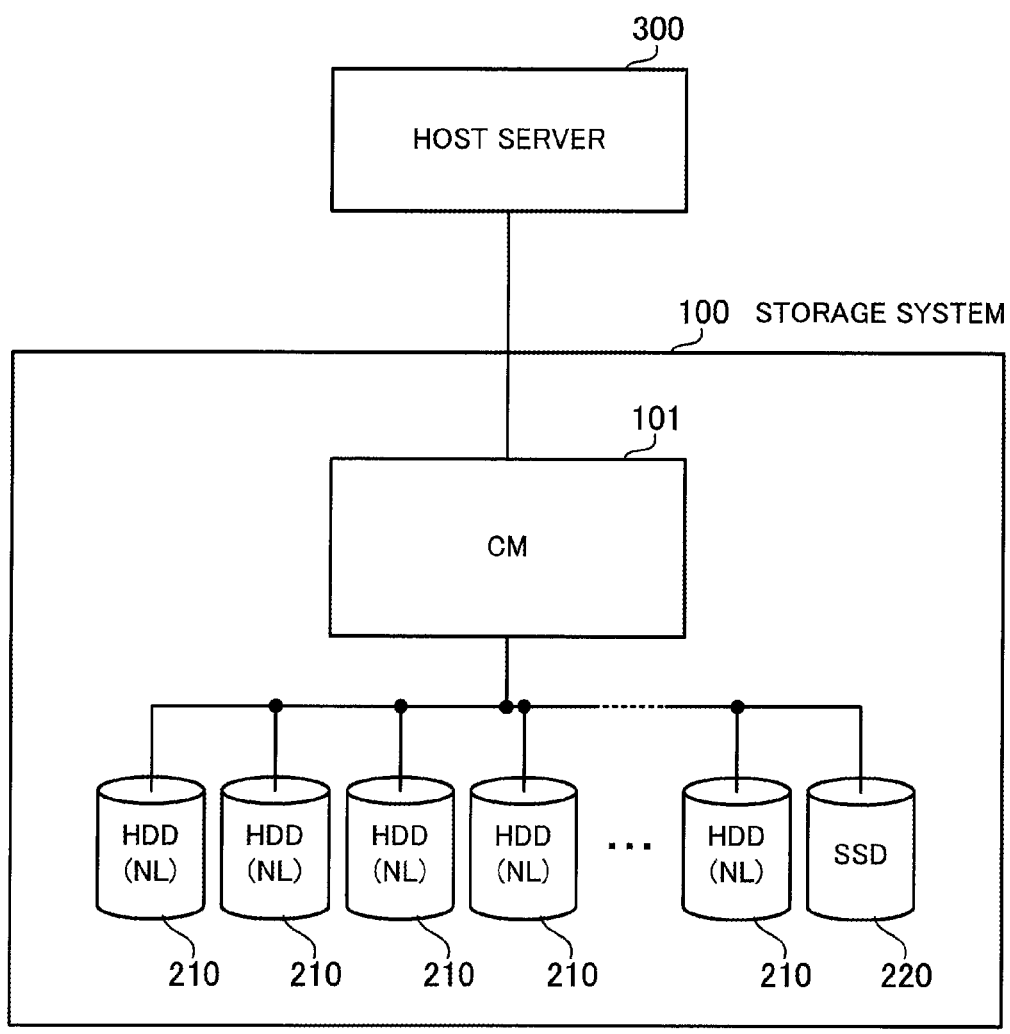
FIG. 2 is an example of the entire configuration of a storage system according to a second embodiment.

FIG. 2 is an example of the entire configuration of a storage system according to a second embodiment. A storage system 100 includes a CM (Controller Module) 101, a plurality of HDDs 210, and at least one SSD 220. In this embodiment it is assumed that each HDD 210 is, for example, a low-cost near line disk. Hereinafter each HDD 210 will be referred to as an "NL disk 210". In order to improve the reliability of processing, the storage system 100 may include a plurality of CMs 101 for realizing redundancy.

A host server 300 is connected to the CM 101. In response to an I/O (In/Out) request from the host server 300, the CM 101 performs an I/O process on an NL disk 210 or the SSD 220. In addition, the CM 101 manages by RAID physical storage areas realized by the NL disks 210, and controls access to these physical storage areas.

Figure 3:
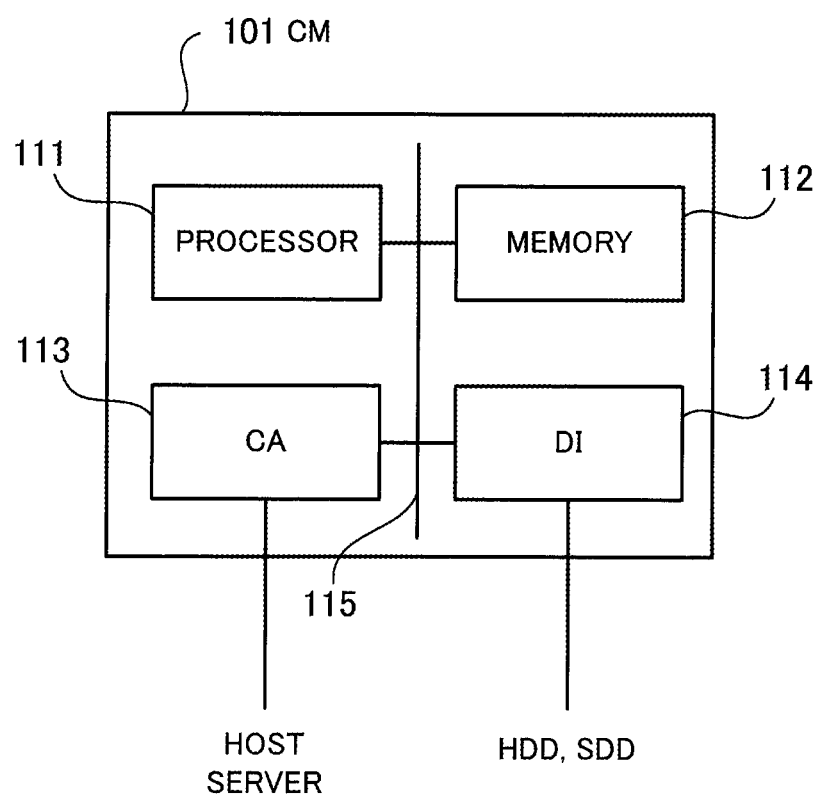
FIG. 3 is an example of the hardware configuration of a CM.

FIG. 3 is an example of the hardware configuration of the CM.

The whole of the CM 101 is controlled by a processor 111. The processor 111 may be a multiprocessor. The processor 111 is a CPU (Central Processing Unit), an MPU (Micro Processing Unit), a DSP (Digital Signal Processor), an ASIC (Application Specific Integrated Circuit), a PLD (Programmable Logic Device), or the like. Furthermore, the processor 111 may be a combination of two or more of a CPU, an MPU, a DSP, an ASIC, and a PLD.

A memory 112 and a plurality of peripheral devices are connected to the processor 111 via a bus 115. The memory 112 stores at least a part of a program executed by the processor 111 or various pieces of data needed for a process performed by this program.

A CA (Channel Adapter) 113 and a DI (Drive Interface) 114 are connected to the processor 111 as peripheral devices.

The CA 113 performs an interface process for data transmission and receiving between the host server 300 and the CM 101. The CA 113 and the host server 300 communicate in accordance with an interface standard such as FC (Fibre Channel), iSCSI (Internet Small Computer System Interface), FCoE (FC over Ethernet) (Ethernet is a registered trademark), or SAS (Serial Attached SCSI).

The DI 114 performs an interface process for data transmission and receiving between an NL disk 210 or the SSD 220 included in the storage system 100 and the CM 101. The DI 114 and an NL disk 210 or the SSD 220 communicate in accordance with an interface standard such as SAS.

The processing functions of the CM 101 are realized by adopting the above hardware configuration. The host server 300 can also be realized as a computer having a hardware configuration like that illustrated in FIG. 3.

Figure 4:
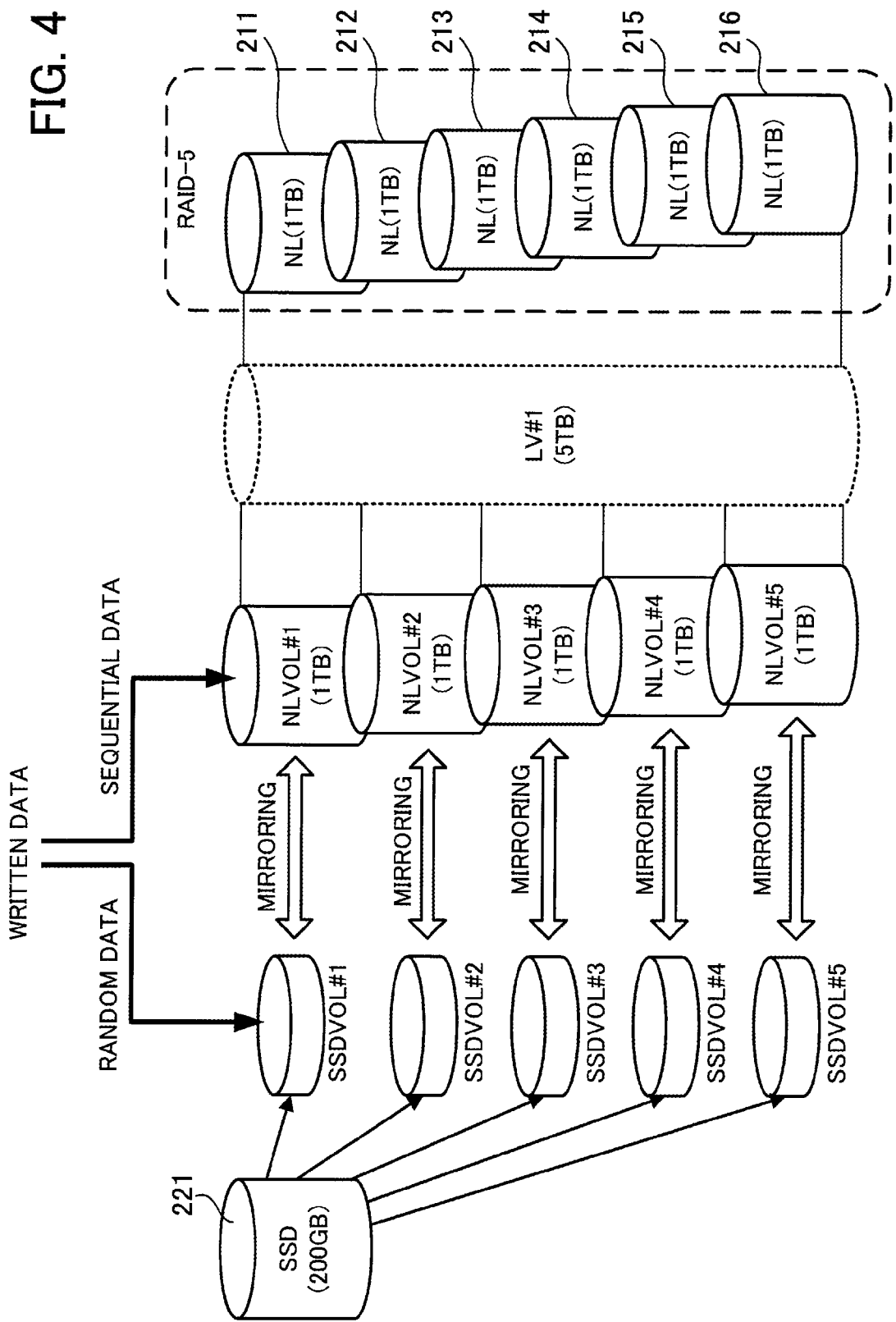
FIG. 4 is an example of the structure of a volume.

An access control process performed by the CM 101 will now be described in detail. FIG. 4 is an example of the structure of a volume.

Near line volumes NLVOLs #1 through #5 (hereinafter simply referred to as "NLVOLs #1 through #5") illustrated in FIG. 4 are logical volumes which are objects of access from the host server 300, and are set by the CM 101. NLVOLs #1 through #5 are logical volumes realized by the use of real storage areas of a plurality of NL disks (NL disks 210 illustrated in FIG. 2) included in the storage system 100. The CM 101 controls writing data to NLVOLs #1 through #5 so that the data will be stored on different NL disks for realizing redundancy.

In this embodiment, for example, NLVOLs #1 through #5 are realized by the use of real storage areas of NL disks 211 through 216. Furthermore, the NL disks 211 through 216 make up a RAID group controlled by, for example, RAID-5. The redundancy of data written to NLVOLs #1 through #5 is realized by the use of parity under the control of the CM 101.

It is assumed that the storage capacity of each of the NL disks 211 through 216 is 1 TB (terabyte). Then the total storage capacity of NLVOLs #1 through #5 is 5 TB. That is to say, storage areas for parity on the NL disks 211 through 216 are excluded. For example, NLVOLs #1 through #5 are obtained by dividing a 5-terabyte logical volume LV #1 realized by the real storage areas of the NL disks 211 through 216.

In this embodiment it is assumed that NLVOLs #1 through #5 are obtained by dividing the logical volume LV #1 by 1 TB from the head. When a logical address on each of NLVOLs #1 through #5 is designated, the CM 101 converts it to a logical address on the logical volume LV #1. Furthermore, the CM 101 determines an access destination physical address on the basis of the logical address after the conversion, the number (six) of the NL disks 211 through 216 by which real storage areas are realized, and stripe size. As a result, when a logical address on each of NLVOLs #1 through #5 is designated, the CM 101 can uniquely determine an access destination physical address from the designated logical address.

As stated above, by using NL disks in particular of HDDs which are comparatively slow in access speed but low in cost per data capacity as storage units which provide real storage areas for realizing logical volumes that are objects of access, the costs of storage units can be reduced. In particular, in order to realize the redundancy of data written to a logical storage area by RAID, a real storage area the capacity of which is larger than that of the logical storage area is needed. This leads to an increase in the number of storage units used for realizing the real storage area. By using HDDs, preferably NL disks, as storage units which make up a RAID group, as stated above, a rise in cost caused by an increase in the number of storage units included in the storage system 100 can be prevented.

By the way, the host sever 300 makes a request to write data, and the CM 101 writes the data to one of NLVOLs #1 through #5. At this time the CM 101 determines whether a write pattern is sequential access or random access. Hereinafter written data will be referred to as "sequential data" if a write pattern is sequential access. Furthermore, written data will be referred to as "random data" if a write pattern is random access.

On the basis of a write pattern determination result, the CM 101 writes the sequential data to NLVOLs #1 through #5. In this case, the operation of writing to the NL disks 211 through 216 is performed. On the other hand, the CM 101 writes the random data to an SSD 221 in place of NLVOLs #1 through #5. As a result, time taken to write is reduced compared with a case where the random data is written to NLVOLs #1 through #5. The SSD 221 is one of the SSDs 220 (see FIG. 2) included in the storage system 100.

The CM 101 sets SSD volumes SSDVOL #1 through #5 (hereinafter simply referred to as "SSDVOLs #1 through #5") illustrated in FIG. 4 as random data write destinations. SSDVOLs #1 through #5 are generated so that they will correspond to NLVOLs #1 through #5 respectively. For example, the CM 101 writes random data a write destination of which is NLVOL #1 to SSDVOL #1, and writes random data a write destination of which is NLVOL #2 to SSDVOL #2.

Furthermore, the CM 101 writes random data written to one of SSDVOLs #1 through #5 to a corresponding position on a corresponding volume of NLVOLs #1 through #5 at determined timing to mirror the random data. For example, the CM 101 writes random data written to SSDVOL #1 to a corresponding position on NLVOL #1.

SSDVOLs #1 through #5 are virtual volumes generated by virtualizing the SSD 221. The CM 101 allocates a free area of the SSD 221 at need to each of SSDVOLs #1 through #5. Therefore, the size of each of SSDVOLs #1 through #5 changes according to circumstances. One SSD 221 or a plurality of SSDs 221 may be prepared for realizing real storage areas of SSDVOLs #1 through #5. However, the total capacity of prepared real storage areas may be smaller than the total capacity of NLVOLs #1 through #5.

As stated above, a random data write destination is a virtual volume generated by virtualizing the SSD 221. As a result, there is no need to prepare as a random data write destination an SSD the capacity of which is the same as the total capacity of NLVOLs #1 through #5. Therefore, it is possible to check an increase in cost caused by an increase in the capacity of an SSD, while increasing write speed.

For example, writing data to NLVOL #1 will now be described with reference to FIGS. 5 through 8. It is assumed that a storage area of NLVOL #1 is managed by an LBA (Logical Block Address) which is a logical address allocated to each block having determined length. In addition, it is assumed that a determined number of consecutive blocks are managed as a "track". For example, the length of 1 block is 512 bytes and the length of 1 track is 64 KB (kilobytes). However, for the sake of simplicity it is assumed that 1 track includes 8 blocks in FIGS. 5 through 8.

Figure 5:
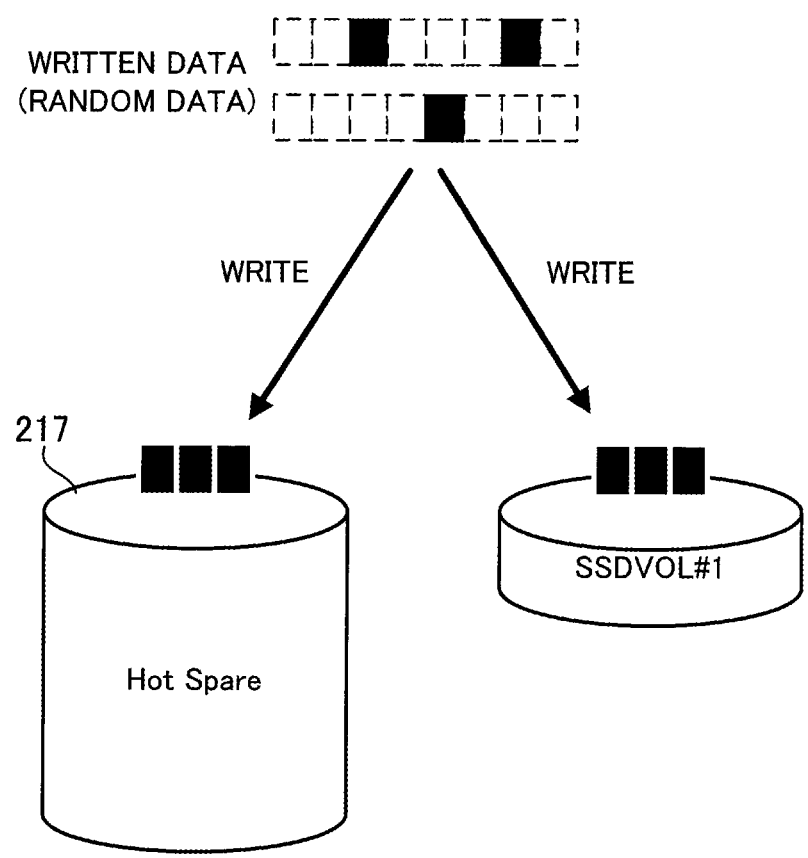
FIG. 5 illustrates a random data write process.

FIG. 5 illustrates a random data write process.

If data written to NLVOL #1 is random data, then the CM 101 writes the data to SSDVOL #1 corresponding to NLVOL #1. In the example of FIG. 5, it is assumed that a request to write data to three blocks in two tracks which are not consecutive is made by a write request command to write to NLVOL #1. In this case, the CM 101 allocates from the SSD 221 to SSDVOL #1 a real storage area corresponding to the three blocks write to which is requested, expands SSDVOL #1, and writes the data to the expanded SSDVOL #1.

Furthermore, the CM 101 not only writes the data to SSDVOL #1 but also writes the same data to an NL disk 217 which is a hot spare (hereinafter referred to as the "hot spare disk 217"). By doing so, the CM 101 duplicates the random data. The hot spare disk 217 is one of the NL disks 210 (see FIG. 2) of the storage system 100 and is prepared as a substitute at the time of the occurrence of a failure in an NL disk included in a RAID group.

If data written to an NLVOL is random data, then the CM 101 writes the data not only to an SSDVOL but also to the hot spare disk 217 in this way to realize data redundancy. This decreases the risk of losing the data due to a failure in a storage unit.

For example, after the CM 101 writes random data to SSDVOL and before the CM 101 writes the same data to the hot spare disk 217, the CM 101 may return a response to the effect that write has been completed. By doing so, time taken to respond to a write request can be reduced.

Figure 6:
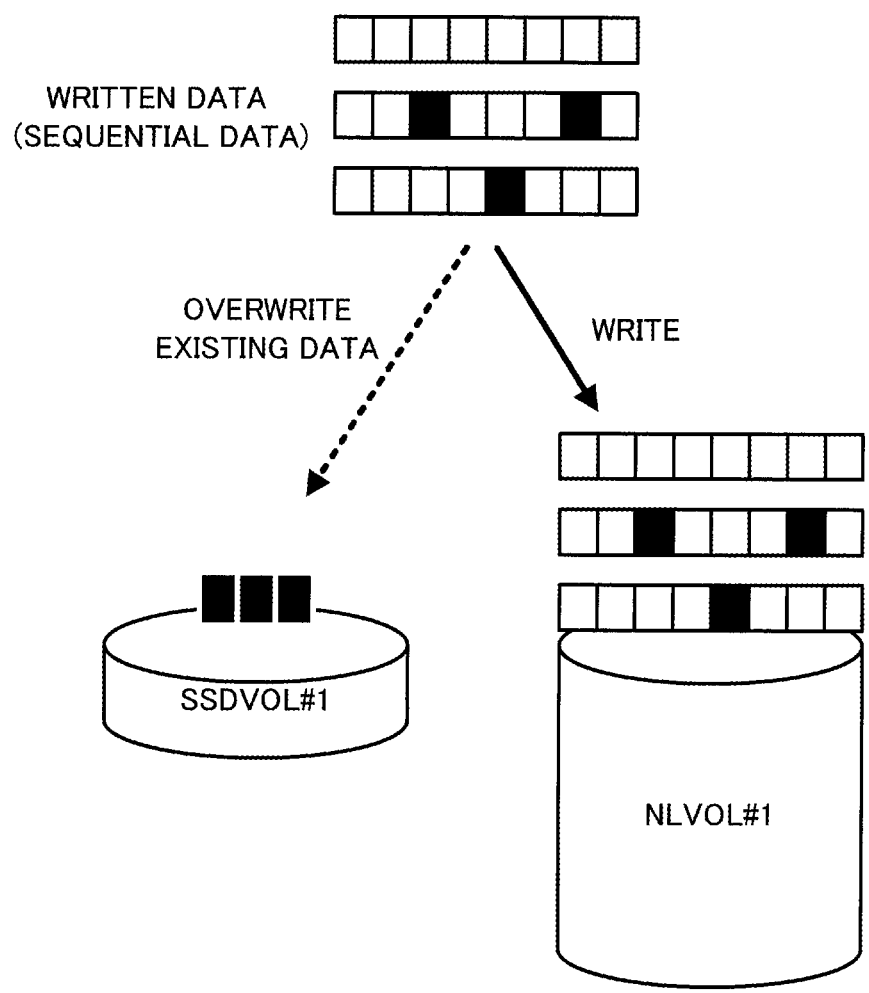
FIG. 6 illustrates a sequential data write process.

FIG. 6 illustrates a sequential data write process.

If data written to NLVOL #1 is sequential data, then the CM 101 writes the data to NLVOL #1. In the example of FIG. 6, it is assumed that a request to write data the amount of which corresponds to three tracks is made by a write request command to write to NLVOL #1.

Furthermore, if of the data written to NLVOL #1, there are blocks which are already written to the corresponding SSDVOL #1, then the CM 101 not only writes new data corresponding to the blocks to NLVOL #1 but also overwrites the corresponding SSDVOL #1 with the new data. In FIG. 6, blocks of the written data which are already written to SSDVOL #1 are painted out in black.

When a request to read out data from NLVOL #1 is made, the CM 101 tries to read out the data from SSDVOL #1 as much as possible. For example, if all pieces of data on which a request to read out from NLVOL #1 is made are stored in SSDVOL #1, then the CM 101 reads out them from SSDVOL #1. By doing so, time taken to read out them is reduced.

As illustrated in FIG. 6, even if the written data is sequential data, the CM 101 overwrites the blocks which are already written to SSDVOL #1 with data, of the written data, corresponding to the blocks which are already written to the SSDVOL #1. By doing so, random data which is written once to SSDVOL #1 is always kept up-to-date and the probability of being able to read out from SSDVOL #1 at data read time becomes high. Therefore, read performance as a whole can be improved.

Figure 7:
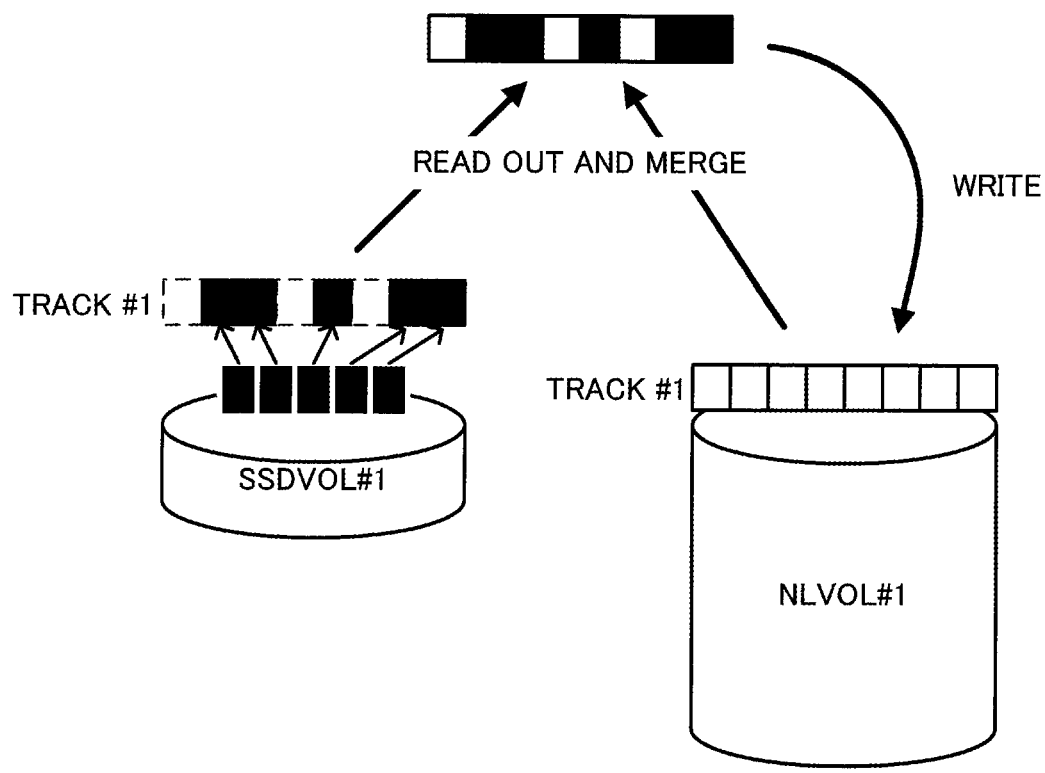
FIG. 7 illustrates a process for merging random data stored in an SSDVOL.

FIG. 7 illustrates a process for merging random data stored in an SSDVOL.

The CM 101 also writes random data written to SSDVOL #1 to the corresponding NLVOL #1 at determined timing. An "SSD storage ratio" indicative of the ratio of data stored on SSDVOL #1 to data in one track is used as one parameter for determining timing at which random data on SSDVOL #1 is written to NLVOL #1.

The CM 101 detects an SSD storage ratio for each track on NLVOL #1 and performs a merge process illustrated in FIG. 7 on a track for which an SSD storage ratio is higher than or equal to a determined threshold. By performing a merge process, data in the same tracks on NLVOL #1 and SSDVOL #1 is combined on the CM 101 and is rewritten to NLVOL #1.

In the example of FIG. 7, data in a second block, a third block, a fifth block, a seventh block, and an eighth block from the head of blocks in a track #1 is stored in SSDVOL #1. For example, it is assumed that an SSD storage ratio of 50% is a determination threshold. Then an SSD storage ratio is greater than the determination threshold in the state illustrated in FIG. 7. At this time the CM 101 reads out data in the track #1 from NLVOL #1 and reads out data in the track #1 from SSDVOL #1.

Up-to-date data is always stored on SSDVOL #1 as a result of the process for writing to SSDVOL #1 illustrated in FIG. 6. Therefore, the CM 101 overwrites data in each block of the track #1 read out from NLVOL #1 with data in a corresponding block of the track #1 read out from SSDVOL #1 to generate up-to-date data in the entire track #1. The CM 101 overwrites NLVOL #1 with the generated up-to-date data in the track #1.

As has been described, even if random data which occupies a part of a track is written to an SSDVOL, the random data is written from the SSDVOL to an NLVOL and is merged with data which is originally stored in the NLVOL. By doing so, the probability that sequential data is stored on the NLVOL becomes high. As a result, when a request to read out data in the track is made, the speed at which data is read out from the NLVOL can be improved.

In addition, the CM 101 transfers from an SSDVOL to an NLVOL only a track for which an SSD storage ratio is greater than or equal to a determined threshold. By doing so, the frequency of transferring data from an SSDVOL to an NLVOL can be minimized. As a result, the processing load on the CM 101 or a load caused by transfer between the CM 101 and an NL disk or an SSD is lightened. Therefore, the influence of a process for transfer from an SSDVOL to an NLVOL on a process for normal access from the CM 101 to an NLVOL can be lessened.

Figure 8:
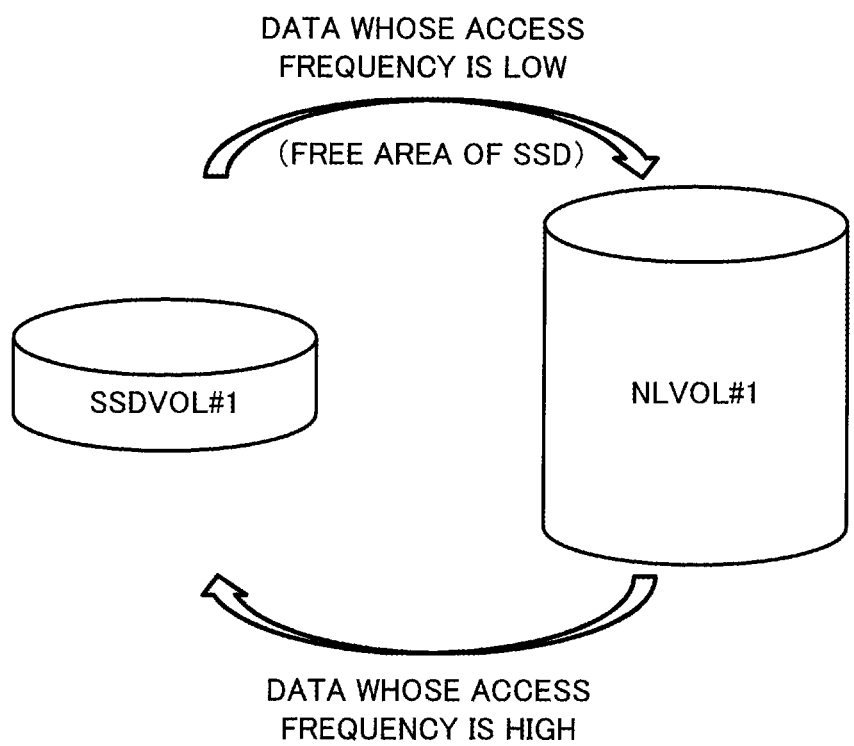
FIG. 8 is another example of data transfer between an SSDVOL and an NLVOL.

FIG. 8 is another example of data transfer between an SSDVOL and an NLVOL.

In FIG. 7, data in the track for which an SSD storage ratio is greater than the determined threshold is transferred from SSDVOL #1 to NLVOL #1. In addition to this, when the frequency of accessing data stored on SSDVOL #1 decreases, the CM 101 transfers the data to NLVOL #1. In this case, the CM 101 invalidates the data on SSDVOL #1 whose access frequency decreases, and frees a real storage area of the SSD 221 in which the data is recorded. The freed real storage area can newly be allocated later to one of SSDVOLs #1 through #5. By performing such a process, a real storage area of the SSD 221 can be allocated to a virtual volume by a necessary amount and a real storage area of the SSD 221 can be used efficiently. In addition, capacity necessary to the SSD 221 can be reduced and the costs can be reduced.

As described later, when remaining capacity of the SSD 221 is smaller than or equal to a determined amount, the CM 101 transfers data stored on an SSDVOL to a corresponding NLVOL and frees a corresponding area of the SSDVOL.

On the other hand, when the frequency of accessing data stored on NLVOL #1 increases, the CM 101 copies the data to the corresponding SSDVOL #1. By doing so, the CM 101 stores on SSDVOL #1 data whose access frequency increases. When a request to read out the data is made, the data can be read out from SSDVOL #1 at a high speed.

In this embodiment it is assumed that the CM 101 detects an access frequency for each track and that the CM 101 transfers data between an SSDVOL and an NLVOL by the track.

Figure 9:
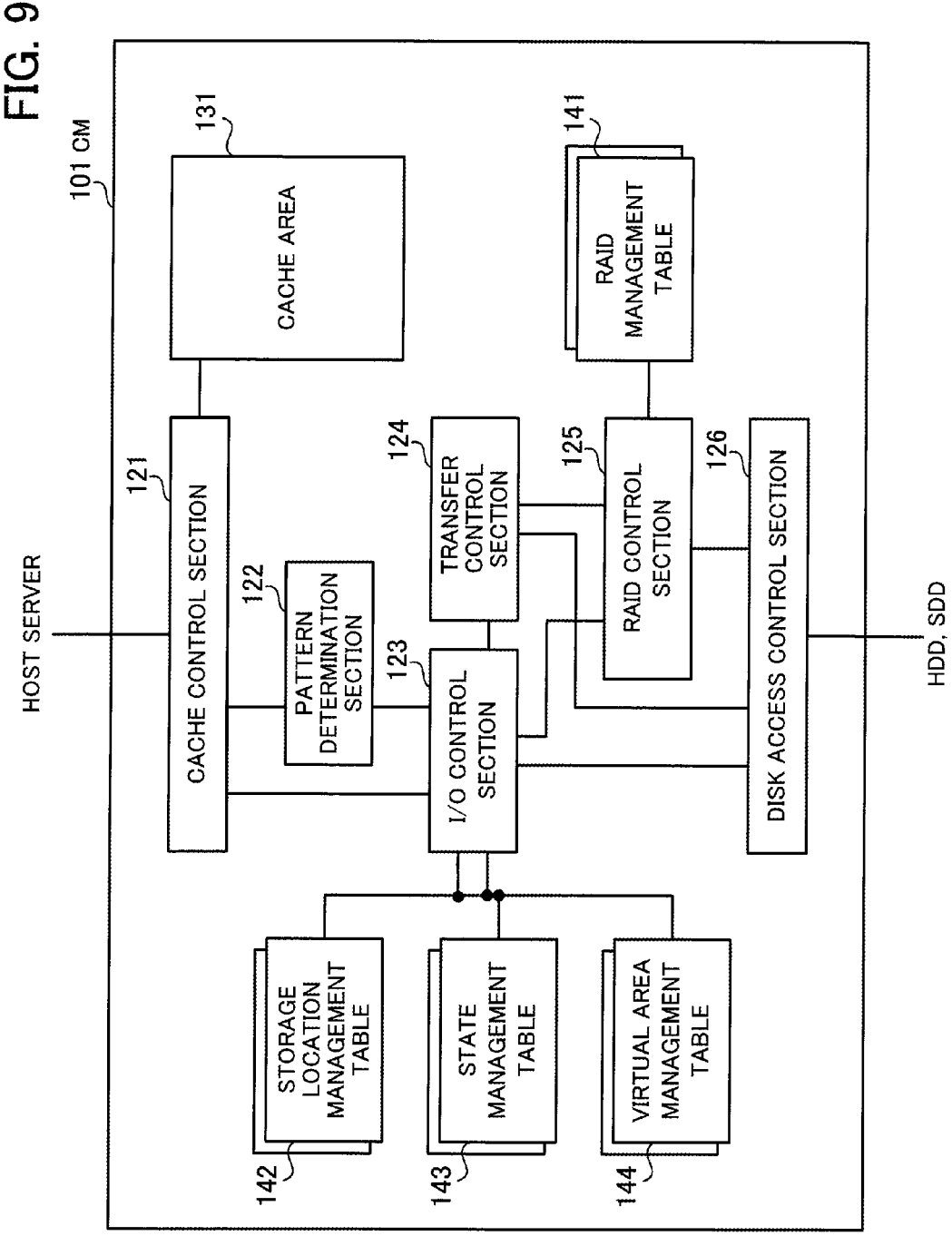
FIG. 9 is a block diagram of an example of a processing function of the CM.

FIG. 9 is a block diagram of an example of a processing function of the CM.

The CM 101 includes a cache control section 121, a pattern determination section 122, an I/O control section 123, a transfer control section 124, a RAID control section 125, and a disk access control section 126. For example, when the processor 111 included in the CM 101 executes a determined program, a process performed by each section is realized.

In addition, a cache area 131 is secured in a storage unit of the CM 101. Furthermore, a RAID management table 141, a storage location management table 142, a state management table 143, and a virtual area management table 144 are stored in the storage unit of the CM 101.

The cache control section 121 exercises control for caching data on an NLVOL to the cache area 131. The cache area 131 is secured, for example, in an SSD (not illustrated) included in the CM 101.

When the cache control section 121 writes back data stored in the cache area 131, the cache control section 121 informs the I/O control section 123 via the pattern determination section 122 of a write command for making a request to write the data to a corresponding NLVOL. In addition, when the CM 101 reads out from an NLVOL data for which the determination that a caching mistake has occurred is made, the cache control section 121 informs the I/O control section 123 of a read command for making a request to read out the data from the NLVOL.

When the pattern determination section 122 accepts a write command from the cache control section 121, the pattern determination section 122 determines whether an access pattern based on the write command is sequential access or random access. The pattern determination section 122 can make this determination on the basis of information, such as a flag indicative of continuity, included in the received write command.

According to a result of determination by the pattern determination section 122, the I/O control section 123 determines a write destination of data to be written back and exercises write control. Basically, as illustrated in FIGS. 5 and 6, the I/O control section 123 determines that a sequential data write destination is an NLVOL and that random data write destinations are an SSDVOL and the hot spare disk. In addition, when the I/O control section 123 accepts a read command from the cache control section 121, the I/O control section 123 refers to the storage location management table 142, recognizes a location from which data is to be read out, and exercises read control.

The transfer control section 124 refers to the storage location management table 142, the state management table 143, and the virtual area management table 144 and controls data transfer between an SSDVOL and an NLVOL.

Both the I/O control section 123 and the transfer control section 124 exercise the following write control or read control.

When data is written to an NLVOL, the I/O control section 123 and the transfer control section 124 inform the RAID control section 125 of an identification number of the write destination NLVOL and a logical address (LBA) of the written data on the NLVOL to make a request to write the data. Furthermore, when data is written to an SSDVOL, the I/O control section 123 and the transfer control section 124 allocate a real storage area corresponding to the capacity of the written data from a free area of the SSD 221 to the SSDVOL.

The I/O control section 123 and the transfer control section 124 then inform the disk access control section 126 of an address of the allocated real storage area to make a request to write to the SSD 221. When the data is written to the hot spare disk, the I/O control section 123 informs the disk access control section 126 of an address of a real address of a write destination to make a request to write to the hot spare disk.

On the other hand, when data is read out from an NLVOL, the I/O control section 123 and the transfer control section 124 inform the RAID control section 125 of an identification number of the NLVOL and a logical address (LBA) of the data on the NLVOL to make a request to read out. Furthermore, when data is read out from an SSDVOL, the I/O control section 123 and the transfer control section 124 refer to the virtual area management table 144 and recognizes a read address in the SSD 221. The I/O control section 123 and the transfer control section 124 then inform the disk access control section 126 of the recognized read address to make a request to read out the data.

The RAID control section 125 refers to the RAID management table 141 and controls access to an NLVOL based on a request from the I/O control section 123 or the transfer control section 124 by the use of RAID. The RAID control section 125 informs the disk access control section 126 of a real address on an NL disk or an SSD which is an access destination to make a request to write or read out data.

In response to a request from the I/O control section 123, the transfer control section 124, or the RAID control section 125, the disk access control section 126 writes data to or reads out data from an NL disk or an SSD.

Figure 10:
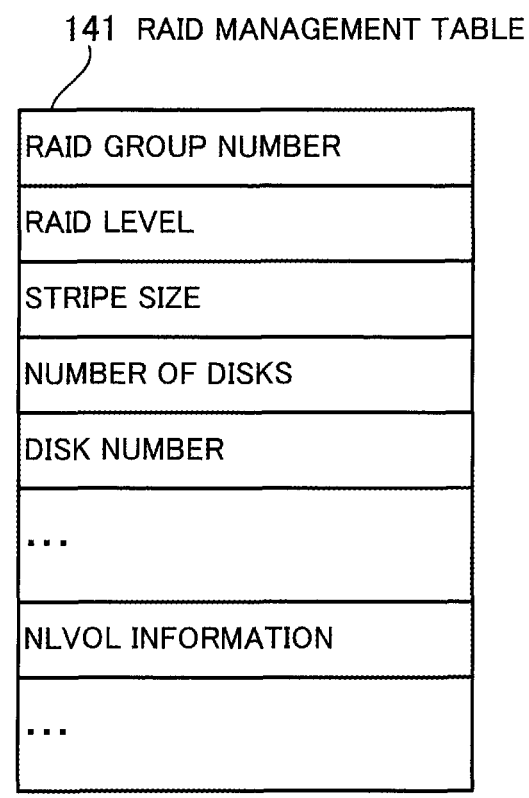
FIG. 10 is an example of data registered in a RAID management table.

FIG. 10 is an example of data registered in the RAID management table. The RAID management table 141 is made for each RAID group and is stored in, for example, the SSD of the CM 101. Information corresponding to RAID Group Number, RAID Level, Stripe Size, Number of Disks, Disk Number, and NLVOL Information items is registered in each RAID management table 141.

RAID Group Number indicates an identification number of a RAID group. RAID Level indicates a RAID level used for controlling a corresponding RAID group. If a RAID level (such as RAID-4, RAID-5, or RAID-6) at which a stripe is used is set, Stripe Size indicates the size of a storage area on each storage unit included in one stripe.

Number of Disks indicates the number of NL disks which belong to a corresponding RAID group. Disk Number indicates an identification number of each NL disk which belongs to a corresponding RAID group. Therefore, the number of registered disk numbers is equal to a number set in the Number of Disks item.

NLVOL Information indicates information regarding each NLVOL obtained by dividing a single logical volume LV (corresponding to the logical volume LV #1 illustrated in FIG. 4) associated with a RAID group number. An identification number of an NLVOL, a leading logical address on the NLVOL of a logical volume indicated by a RAID group number, the size of the NLVOL, and the like are set as NLVOL information.

When the I/O control section 123 and the transfer control section 124 inform the RAID control section 125 of an identification number of an NLVOL and an LBA, the RAID control section 125 recognizes, on the basis of NLVOL information, a logical address on a logical volume LV corresponding to the NLVOL and the LBA of which the RAID control section 125 is informed. In addition, the RAID control section 125 recognizes a real address of an access destination on the basis of a RAID level, stripe size, the number of disks, and disk numbers, informs the disk access control section 126 of the real address, and makes a request for access. Furthermore, when a request to write data is made, the RAID control section 125 performs a process, such as data division or parity calculation, corresponding to a RAID level.

Figure 11:
FIG. 11 is an example of data registered in a storage location management table.

FIG. 11 is an example of data registered in the storage location management table. The storage location management table 142 is made for each NLVOL and is stored in, for example, the SSD of the CM 101.

The storage location management table 142 is for managing where up-to-date data in each block on a corresponding NLVOL is stored. An SSD storage flag, an HS storage flag, and an NL storage flag associated with each LBA on a corresponding NLVOL are registered in each storage location management table 142.

SSD Storage Flag indicates whether or not up-to-date data in a corresponding block is stored on an SSDVOL. If up-to-date data is stored on an SSDVOL, then the value of SSD Storage Flag is "1". If up-to-date data is not stored on an SSDVOL, then the value of SSD Storage Flag is "0".

HS Storage Flag indicates whether or not up-to-date data in a corresponding block is stored on a hot spare disk. If up-to-date data is stored on a hot spare disk, then the value of HS Storage Flag is "1". If up-to-date data is not stored on a hot spare disk, then the value of HS Storage Flag is "0".

NL Storage Flag indicates whether or not up-to-date data in a corresponding block is stored on an NLVOL. If up-to-date data is stored on an NLVOL, then the value of NL Storage Flag is "1". If up-to-date data is not stored on an NLVOL, then the value of NL Storage Flag is "0".

FIG. 12 is an example of data registered in the state management table. The state management table 143 is made for each NLVOL and is temporarily stored in, for example, the memory 112 of the CM 101.

The state management table 143 is for managing the state of each track on a corresponding NLVOL. An SSD storage ratio, SSD access frequency, and NL access frequency associated with each track number of a corresponding NLVOL are registered in the state management table 143. For example, the I/O control section 123 detects an SSD storage ratio, SSD access frequency, and NL access frequency and registers them in the state management table 143.

SSD Storage Ratio indicates the ratio of data stored on an SSDVOL to data in a corresponding track. SSD Storage Ratio is calculated, for example, by the block and is calculated as the ratio (%) of the number of blocks for which data is stored on an SSDVOL to the number of blocks in a corresponding track.

If data in at least one block in a corresponding track is stored on an SSDVOL, SSD Access Frequency indicates frequency of accessing the data stored on the SSDVOL. If data in at least one block in a corresponding track is stored on an NLVOL, NL Access Frequency indicates frequency of accessing the data stored on the NLVOL.

Access frequency indicates, for example, the number of times write or read is performed by the track in the last determined period. Furthermore, when access to at least one block in a corresponding track occurs in response to, for example, one I/O request from the cache control section 121, access frequency is incremented.

If data in a corresponding track is not stored on an SSDVOL, then "NULL", for example, which indicates that a valid numeric value is not registered is registered in the SSD Access Frequency column. Similarly, if data in a corresponding track is not stored on an NLVOL, then "NULL" which indicates that a valid numeric value is not registered is registered in the NL Access Frequency column.

FIG. 13 is an example of data registered in the virtual area management table. The virtual area management table 144 is made for each NLVOL and is stored in, for example, the SSD of the CM 101.

The virtual area management table 144 is for managing which real storage area in an SSD data in each block on a corresponding NLVOL is stored in. In addition to this, the virtual area management table 144 has a function for managing areas of real storage areas in an SSD which are already allocated to virtual volumes.

A physical address in an SSD associated with each LBA on a corresponding NLVOL is registered in the virtual area management table 144. In the virtual area management table 144, a physical address in an SSD is registered only for an LBA for which "1" is set in the SSD Storage Flag column of the storage location management table 142.

A process performed by the CM 101 will now be described by the use of a flow chart. A case where access to NLVOL #1 is gained will be taken as an example.

Figure 14:
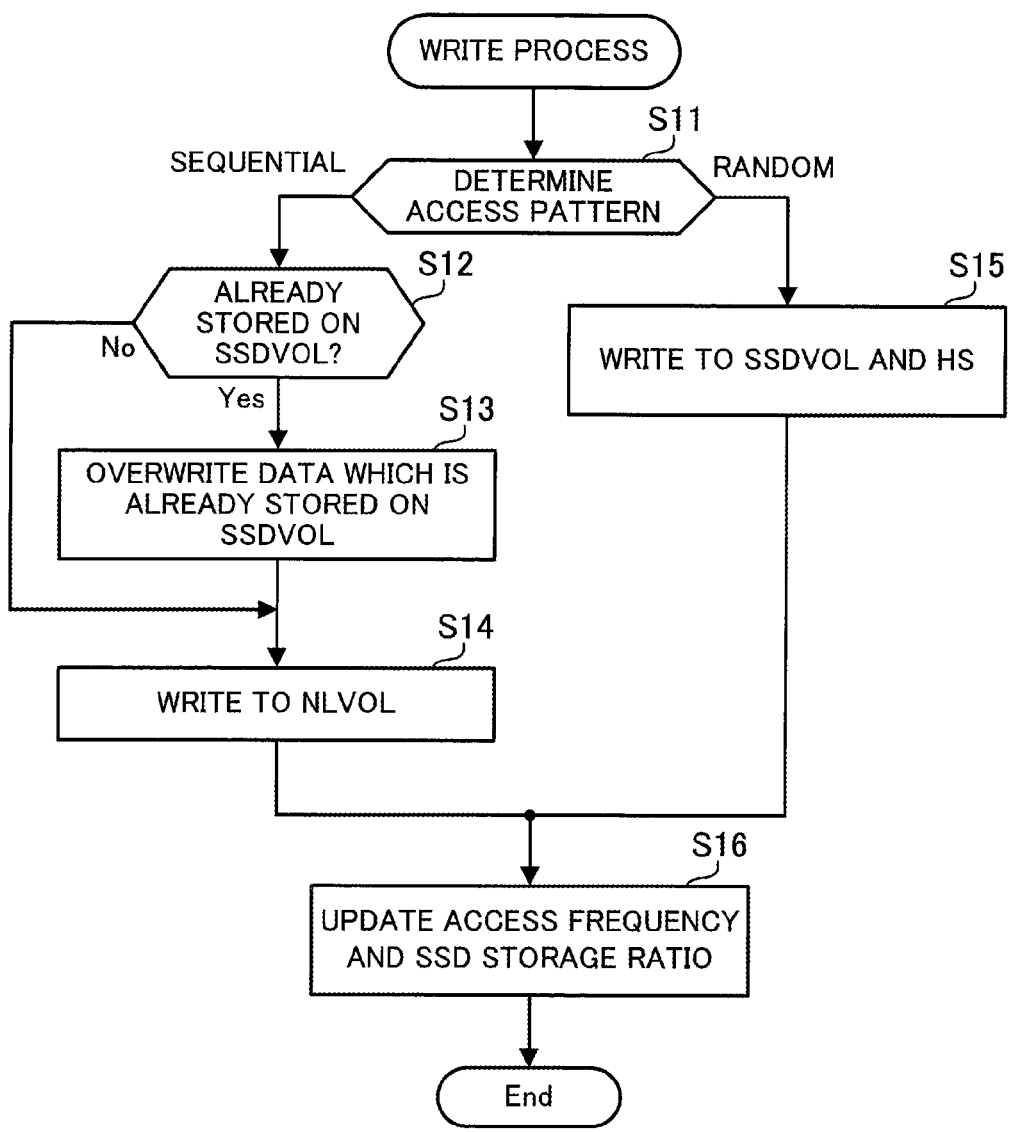
FIG. 14 is a flow chart of an example of a write process.

FIG. 14 is a flow chart of an example of a write process. A process indicated in FIG. 14 is performed when the cache control section 121 issues to the pattern determination section 122 a write command for writing data to NLVOL #1.

(Step S11) The pattern determination section 122 determines an access pattern based on the issued write command, and informs the I/O control section 123 of the write command and a determination result. If an access pattern is sequential access, then step S12 is performed. If an access pattern is random access, then step S15 is performed.

(Step S12) The I/O control section 123 refers to the storage location management table 142 and determines whether or not at least a part of the written data for which a write request is made is already stored on the corresponding SSDVOL #1. If at least one of SSD storage flags corresponding to LBAs included in a write destination area is "1", then the I/O control section 123 determines that at least a part of the written data is already stored on SSDVOL #1.

If at least a part of the written data is already stored on SSDVOL #1, then the I/O control section 123 performs step S13. If none of the written data is stored on SSDVOL #1, then the I/O control section 123 performs step S14.

(Step S13) The I/O control section 123 overwrites corresponding data which is already stored on SSDVOL #1 with data at an LBA, of the LBAs included in the write destination area, for which an SSD storage flag is "1".

The I/O control section 123 refers to the virtual area management table 144 and reads out a physical address in an SSD associated with the LBA for which an SSD storage flag is "1". By doing so, the I/O control section 123 recognizes a real storage area of the SSD to which the corresponding data is already written. The I/O control section 123 informs the disk access control section 126 of the physical address at which overwrite is to be performed and data for the overwrite corresponding to the physical address to make a write request.

As a result, of the sequential data for which the write request is made by the cache control section 121, the data which is already stored on SSDVOL #1 is updated by the new data. Therefore, if sequential data is written and a part of the sequential data is already stored on SSDVOL #1, then the data on SSDVOL #1 is also changed to up-to-date data and can be read out from SSDVOL #1.

The data with which overwrite is performed in step S13 is also written to NLVOL #1 in the next step S14 in order to realize redundancy. Accordingly, there is no need for the I/O control section 123 to store on the hot spare disk the data with which SSDVOL #1 is overwritten. The I/O control section 123 changes an NL storage flag in the storage location management table 142 corresponding to the LBA for which the overwrite is performed to "0".

(Step S14) The I/O control section 123 requests the RAID control section 125 to write the written data to NLVOL #1. The RAID control section 125 controls writing to an NL disk according to a RAID level. Furthermore, the I/O control section 123 recognizes LBAs, of the write destination LBAs on NLVOL #1, for which SSD storage flags are "0" in the storage location management table 142, and changes the SSD storage flags corresponding to the recognized LBAs to "1".

(Step S15) The I/O control section 123 requests the disk access control section 126 to write the written data to SSDVOL #1 and the hot spare disk.

The I/O control section 123 refers to the storage location management table 142, allocates to SSDVOL #1 a new real storage area for storing data in blocks, of the written data, which are not yet written to SSDVOL #1 (for which SSD storage flags are "0"), and expands a real storage area of SSDVOL #1. To be concrete, on the basis of the virtual area management table 144, the I/O control section 123 acquires free addresses in an SSD corresponding to LBAs, of the LBAs included in the write destination area, for which write to SSDVOL #1 is not yet performed. The I/O control section 123 associates the acquired addresses with the LBAs in the virtual area management table 144 for which write is not yet performed, and registers them. By doing so, a real storage area of SSDVOL #1 is expanded. In addition, the I/O control section 123 changes SSD storage flags and HS storage flags in the storage location management table 142 corresponding to the LBAs for which write is not yet performed to "1".

Furthermore, the I/O control section 123 refers to the storage location management table 142 and extracts LBAs on NLVOL #1, of the write destination LBAs, at which old data is written (for which NL storage flags are "1"). The I/O control section 123 changes the NL storage flags corresponding to the extracted LBAs to "0" and invalidates the old data on NLVOL #1.

Even if write to the hot spare click is not completed at the time when write to SSDVOL #1 is completed, the I/O control section 123 may inform the cache control section 121 that write is completed. By doing so, time taken for the cache control section 121 to perform a writeback process can be reduced.

(Step S16) The I/O control section 123 increments access frequency in the state management table 143 corresponding to a track including the write destination LBAs, and updates an SSD storage ratio in the state management table 143 at need. When write to SSDVOL #1 is performed, the I/O control section 123 increments SSD access frequency corresponding to the track corresponding to the write destination, and updates an SSD storage ratio. In addition, when write to NLVOL #1 is performed, the I/O control section 123 increments NL access frequency corresponding to the track corresponding to the write destination.

The I/O control section 123 may perform step S16 after the I/O control section 123 informs the cache control section 121 that write is completed.

Figure 15:
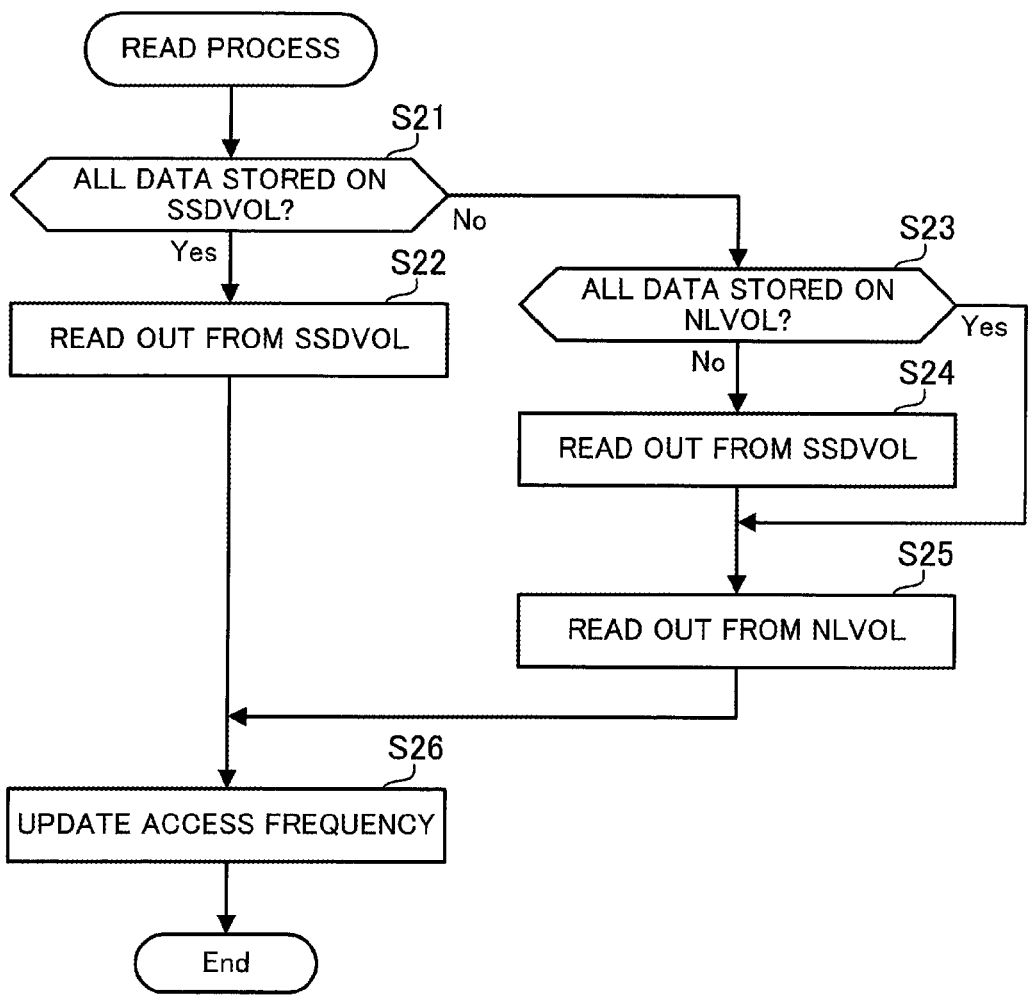
FIG. 15 is a flow chart of an example of a read process.

FIG. 15 is a flow chart of an example of a read process. A process indicated in FIG. 15 is performed when the cache control section 121 issues to the I/O control section 123 a read command for reading out data from NLVOL #1.

(Step S21) The I/O control section 123 refers to SSD storage flags in the storage location management table 142 corresponding to LBAs from which read is performed, and determines whether or not all the data to be read out is stored on SSDVOL #1. If all the data to be read out is stored on SSDVOL #1, then the I/O control section 123 performs step S22.

On the other hand, if at least a part of the data to be read out is not stored on SSDVOL #1, then the I/O control section 123 performs step S23.

(Step S22) The I/O control section 123 requests the disk access control section 126 to read out from SSDVOL #1 the data to be read out. At this time the I/O control section 123 reads out from the virtual area management table 144 a real address indicative of a storage location of the data to be read out, and informs the disk access control section 126 of the real address.

(Step S23) The I/O control section 123 refers to NL storage flags in the storage location management table 142 corresponding to the LBAs from which read is performed, and determines whether or not all the data to be read out is stored on NLVOL #1. If all the data to be read out is stored on NLVOL #1, then the I/O control section 123 performs step S25. On the other hand, if at least a part of the data to be read out is not stored on NLVOL #1, then the I/O control section 123 performs step S24.

(Step S24) The I/O control section 123 requests the disk access control section 126 to read out data, of the data to be read out, which is stored on SSDVOL #1. At this time the I/O control section 123 reads out from the virtual area management table 144 a real address indicative of a storage location of the data, and informs the disk access control section 126 of the real address.

(Step S25) The I/O control section 123 requests the RAID control section 125 to read out data, of the data to be read out, which is stored on NLVOL #1.

If both steps S24 and S25 are performed, then in step S25 the I/O control section 123 merges the data read out from SSDVOL #1 and the data read out from NLVOL #1 to generate read data, and transfers the read data to the cache control section 121.

(Step S26) The I/O control section 123 increments access frequency in the state management table 143 corresponding to a track including the read source LBAs. If read from SSDVOL #1 is performed, then the I/O control section 123 increments SSD access frequency corresponding to the track corresponding to the read source. Furthermore, if read from NLVOL #1 is performed, then the I/O control section 123 increments NL access frequency corresponding to the track corresponding to the read source.

After the I/O control section 123 transfers the read data to the cache control section 121 to make a response, the I/O control section 123 may perform step S26.

Figure 16:
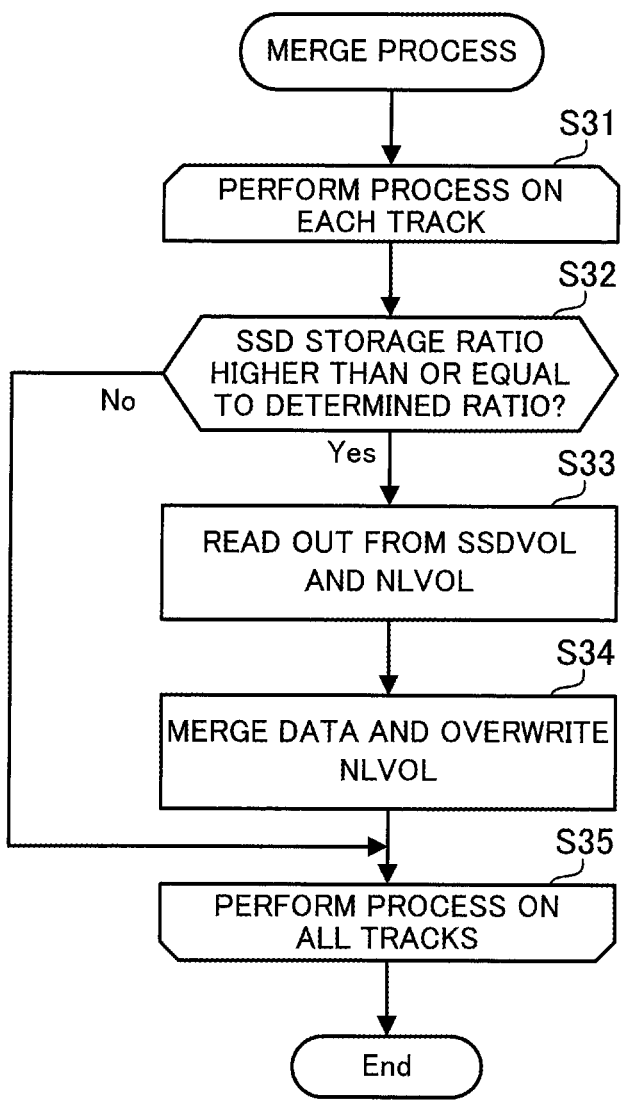
FIG. 16 is a flow chart of an example of a merge process.

FIG. 16 is a flow chart of an example of a merge process. Each time the I/O control section 123 receives a write request command from the cache control section 121, the transfer control section 124 performs a process indicated in FIG. 16. However, the transfer control section 124 begins to perform the process indicated in FIG. 16 after the I/O control section 123 responds to the write request command from the cache control section 121. By doing so, a delay in responding to a write request can be eliminated.

(Step S31) The transfer control section 124 selects tracks including a write destination area designated by a write request command in order from a leading track, and performs on each track the process from step S31 through step S35 at the end of a loop.

(Step S32) The transfer control section 124 reads out from the state management table 143 an SSD storage ratio corresponding to a selected track, and determines whether or not the SSD storage ratio is higher than or equal to a determined ratio. If the SSD storage ratio is higher than or equal to the determined ratio, then the transfer control section 124 performs step S33. If the SSD storage ratio is lower than the determined ratio, then the transfer control section 124 performs step S35.

(Step S33) On the basis of the storage location management table 142, the transfer control section 124 reads out data corresponding to the selected track from SSDVOL #1 and NLVOL #1. The transfer control section 124 requests the disk access control section 126 to read out data from SSDVOL #1, and requests the RAID control section 125 to read out data from NLVOL #1.

(Step S34) The transfer control section 124 merges the data corresponding to the selected track read out in step S33, and requests the RAID control section 125 to overwrite the same track on NLVOL #1 with data generated by the merge.

(Step S35) After the transfer control section 124 performs the process from step S31 through step S35 on all the tracks including the write destination area, the transfer control section 124 ends the merge process.

The merge process may be performed, for example, regardless of whether a write request command is received. For example, the transfer control section 124 performs a merge process by performing steps S32 through S34 indicated in FIG. 16 on all tracks that are registered in the state management table 143, and repeats this merge process at regular intervals.

Figure 17:
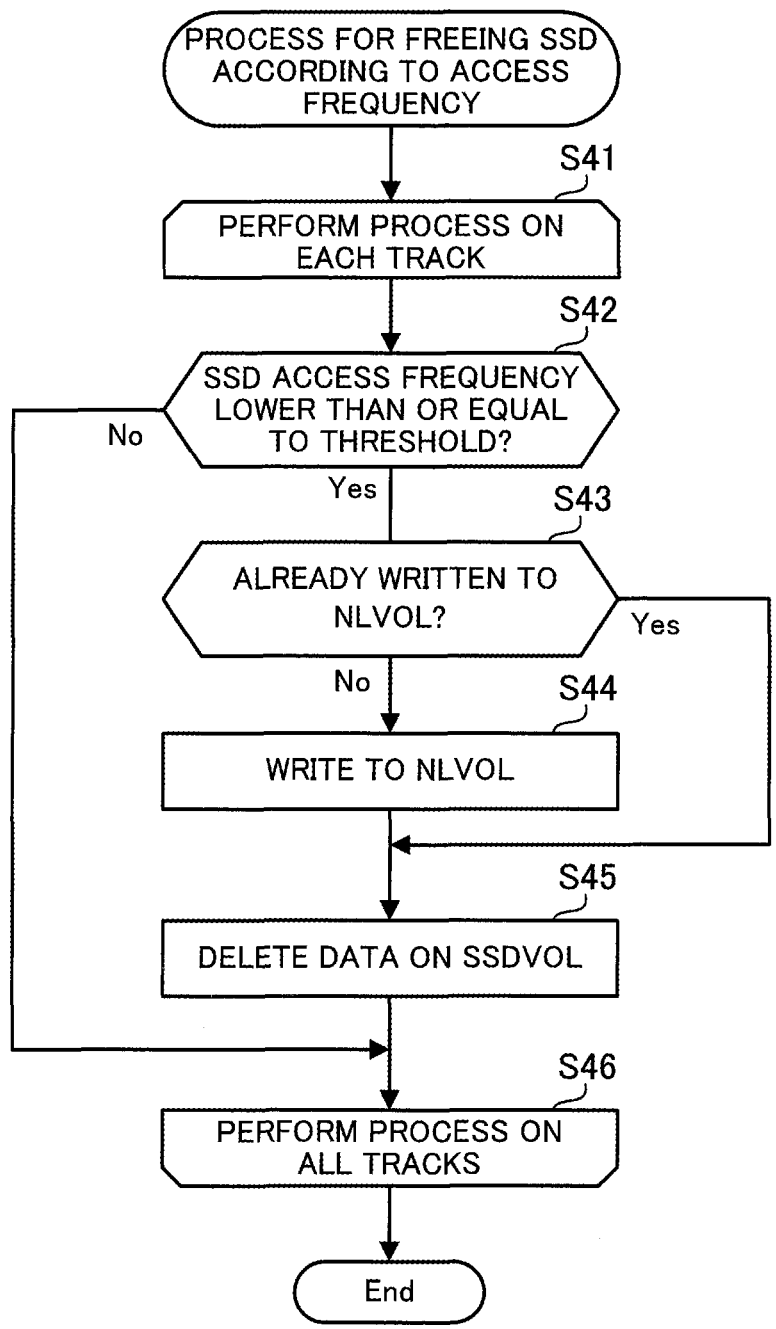
FIG. 17 is a flow chart of an example of a process for freeing an SSD according to access frequency.

FIG. 17 is a flow chart of an example of a process for freeing an SSD according to access frequency.

(Step S41) The transfer control section 124 selects tracks in the state management table 143 in order from a leading track, and performs on each track a process from step S41 through step S46 at the end of a loop.

(Step S42) The transfer control section 124 reads out SSD access frequency corresponding to a selected track, and determines whether or not the SSD access frequency is lower than or equal to a determined threshold. If the SSD access frequency is lower than or equal to the determined threshold, then the transfer control section 124 performs step S43. If the SSD access frequency is higher than the determined threshold, then the transfer control section 124 performs step S46.

(Step S43) On the basis of the storage location management table 142, the transfer control section 124 determines whether or not all data on SSDVOL #1 corresponding to the selected track is already written to NLVOL #1. If all the data on SSDVOL #1 corresponding to the selected track is also written already to NLVOL #1, then the transfer control section 124 performs step S45. On the other hand, if there is data on SSDVOL #1 corresponding to the selected track which is not yet written to NLVOL #1, then the transfer control section 124 performs step S44.

In step S43 the transfer control section 124 reads out an SSD storage flag and an NL storage flag from a record in the storage location management table 142 of each LBA included in the selected track. If there is an LBA for which an SSD storage flag is "1" and for which an NL storage flag is "0", then the transfer control section 124 determines that data on SSDVOL #1 corresponding to the LBA is not written to NLVOL #1. On the other hand, if there is an LBA for which an SSD storage flag is "1" and for which an NL storage flag is "1", then the transfer control section 124 determines that data corresponding to the LBA is written both to SSDVOL #1 and to NLVOL #1.

(Step S44) The transfer control section 124 requests the disk access control section 126 to read out from SSDVOL #1 data corresponding to the LBA for which an SSD storage flag is "1" and for which an NL storage flag is "0". The transfer control section 124 requests the RAID control section 125 to write the data which is read out to NLVOL #1.

For example, in step S44 the transfer control section 124, as in steps S33 and S34 indicated in FIG. 16, may read out data corresponding to the track from SSDVOL #1 and NLVOL #1, merge the data, and overwrite NLVOL #1 with data generated by the merge.

(Step S45) The transfer control section 124 deletes the data on SSDVOL #1 corresponding to the selected track. In step S45 the transfer control section 124 changes all SSD storage flags in the storage location management table 142 corresponding to LBAs included in the selected track to "0". Furthermore, the transfer control section 124 deletes all physical addresses in the virtual area management table 144 corresponding to the LBAs included in the selected track. By performing the latter process, a physical storage area of the SSD allocated to SSDVOL #1 for storing the data read out in step S44 from SSDVOL #1 is freed and the physical storage area is changed to an unused area.

(Step S46) The transfer control section 124 performs the process from step S41 through step S46 on all the tracks in the state management table 143 and then ends the SSD freeing process.

The above process indicated in FIG. 17 is repeated, for example, at regular intervals.

Figure 18:
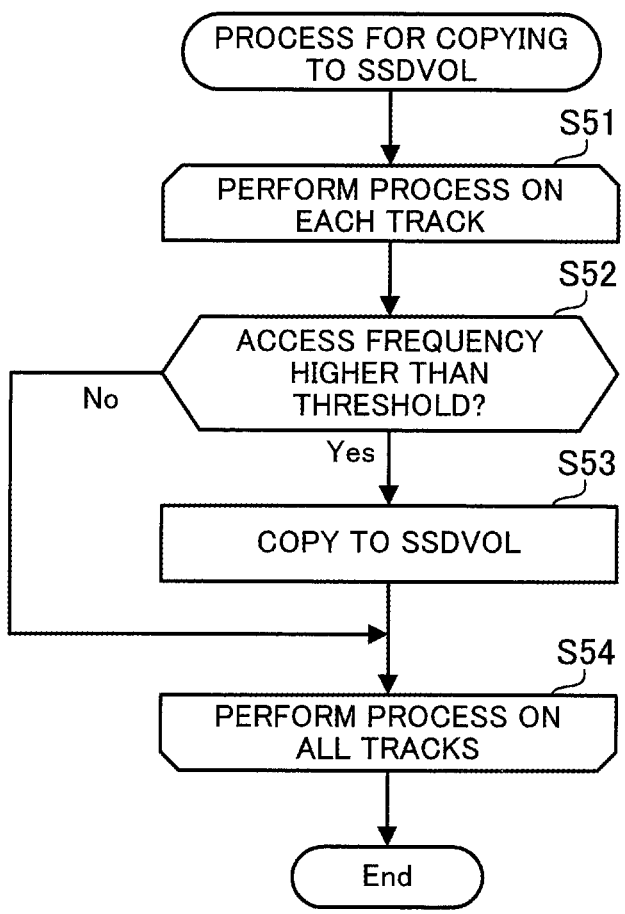
FIG. 18 is a flow chart of an example of a process for copying from an NLVOL to an SSDVOL.

FIG. 18 is a flow chart of an example of a process for copying from an NLVOL to an SSDVOL. When the I/O control section 123 writes to an NLVOL in response to a write request command from the cache control section 121 or when the I/O control section 123 reads out from an NLVOL or an SSDVOL in response to a read request command from the cache control section 121, the transfer control section 124 performs a process indicated in FIG. 18. However, the transfer control section 124 begins to perform the process indicated in FIG. 18 after the I/O control section 123 responds to the write request command or the read request command from the cache control section 121. By doing so, a delay in responding to a write request or a read request can be eliminated.

(Step S51) The transfer control section 124 selects tracks including a write destination area designated by a write request command or a read source area designated by a read request command in order from a leading track, and performs on each track the process from step S51 through step S54 at the end of a loop.

(Step S52) The transfer control section 124 reads out from the state management table 143 NL access frequency corresponding to a selected track, and determines whether or not the NL access frequency is higher than a determined threshold. If the NL access frequency is higher than the determined threshold, then the transfer control section 124 performs step S53. If the NL access frequency is lower than or equal to the determined threshold, then the transfer control section 124 performs step S54.

(Step S53) The transfer control section 124 performs a process for copying data corresponding to the selected track from NLVOL #1 to SSDVOL #1.

In step S53 the transfer control section 124 refers to the storage location management table 142 and recognizes data, of data corresponding to LBAs included in the selected track, which is stored on NLVOL #1 and not on SSDVOL #1. The transfer control section 124 requests the RAID control section 125 to read out the recognized data from NLVOL #1. The transfer control section 124 allocates to SSDVOL #1 a real storage area of an SSD for storing the data read out from NLVOL #1, and requests the disk access control section 126 to write the data read out from NLVOL #1 to SSDVOL #1 to which the real storage area is allocated.

(Step S54) The transfer control section 124 performs the process from step S51 through step S54 on all the tracks including the write destination area or the read source area, and then ends the copy process.

A process for copying from an NLVOL to an SSDVOL may be performed, for example, regardless of whether a write request command or a read request command is received. For example, the transfer control section 124 performs the above copy process by performing steps S52 and S53 indicated in FIG. 18 on all tracks that are registered in the state management table 143, and repeats this copy process at regular intervals.

Figure 19:
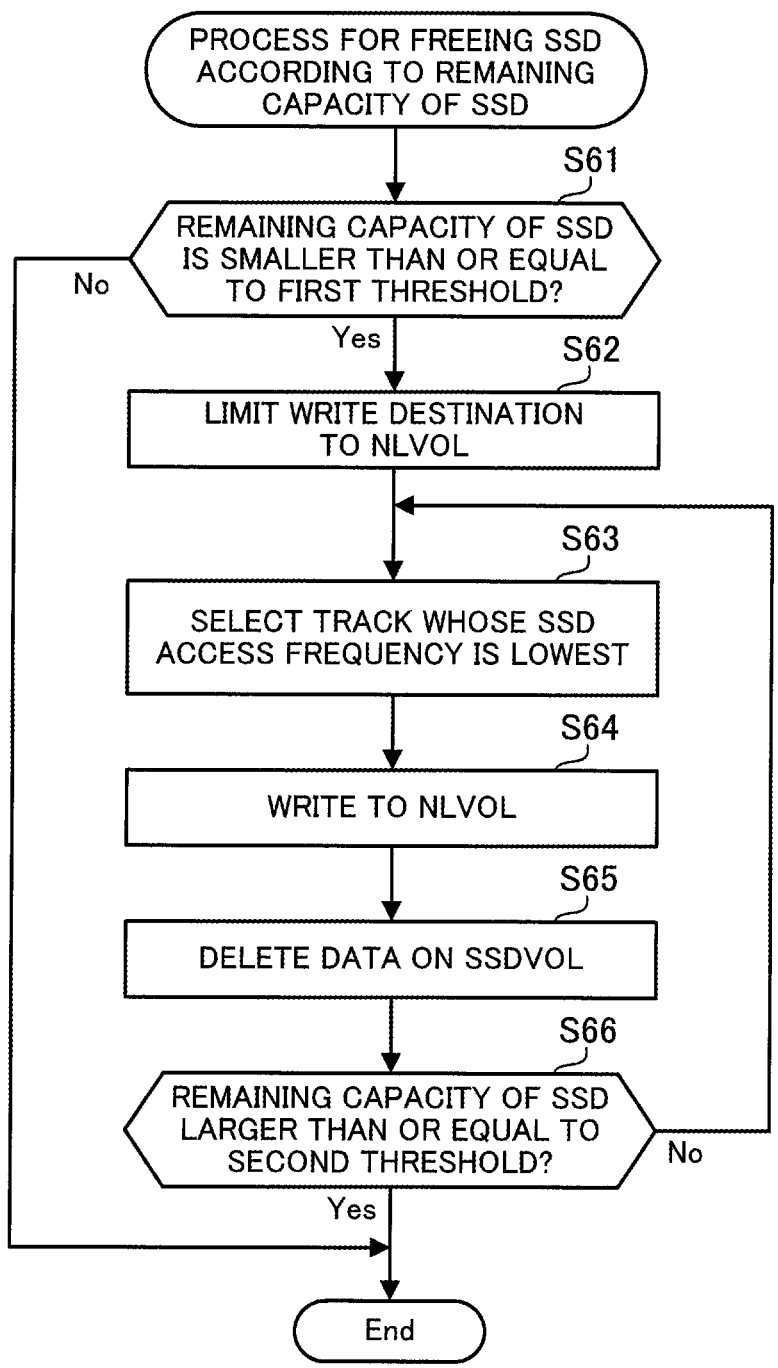
FIG. 19 is a flow chart of an example of a process for freeing an SSD according to remaining capacity of the SSD.

FIG. 19 is a flow chart of an example of a process for freeing an SSD according to remaining capacity of the SSD.

When the I/O control section 123 writes to an SSDVOL in response to a write request command from the cache control section 121 or when the transfer control section 124 writes to an SSDVOL by performing a process for copying from an NLVOL to the SSDVOL indicated in FIG. 18, the transfer control section 124 performs a process indicated in FIG. 19. In the former case, however, the transfer control section 124 begins to perform the process indicated in FIG. 19 after the I/O control section 123 responds to the write request command from the cache control section 121.

The process indicated in FIG. 19 may be performed regardless of the above timing at which write to an SSDVOL is performed. For example, the transfer control section 124 may repeat the process indicated in FIG. 19 at regular intervals.

(Step S61) The transfer control section 124 determines whether or not remaining capacity of the SSD is smaller than or equal to a determined first threshold. If remaining capacity of the SSD is smaller than or equal to the first threshold, then the transfer control section 124 performs step S62. If remaining capacity of the SSD is larger than the first threshold, then the transfer control section 124 ends the SSD freeing process.

The transfer control section 124 can detect remaining capacity of the SSD by recognizing, on the basis of the virtual area management table 144, a real storage area of the SSD which is not allocated to each SSDVOL.

(Step S62) The transfer control section 124 limits to an NLVOL a write destination to which the I/O control section 123 writes data, and inhibits the I/O control section 123 from writing new data to an SSDVOL.

(Step S63) The transfer control section 124 selects a track for which SSD access frequency is the lowest from the state management tables 143 for all NLVOLs.

(Step S64) The transfer control section 124 performs a process for reading out data in the track selected in step S63 from an SSDVOL and writing the data to an NLVOL.

In step S64 the transfer control section 124 refers to the storage location management table 142 and recognizes data, of the data at LBAs included in the track, which is stored on an SSDVOL and not on an NLVOL. The transfer control section 124 requests the disk access control section 126 to read out the recognized data from the SSDVOL. Furthermore, the transfer control section 124 requests the RAID control section 125 to write the data read out from the SSDVOL to a corresponding NLVOL.

(Step S65) The transfer control section 124 deletes from the SSDVOL the data read out in step S64 from the SSDVOL. In step S65 the transfer control section 124 changes to "0" all SSD storage flags in the storage location management table 142 corresponding to LBAs, of the LBAs included in the track, for which data is stored on an SSDVOL and not on an NLVOL. In addition, the transfer control section 124 erases all physical addresses in the virtual area management table 144 corresponding to the LBAs, of the LBAs included in the track, for which data is stored on an SSDVOL and not on an NLVOL. By performing the latter process, a physical storage area of the SSD allocated to the SSDVOL for storing the data read out in step S64 from the SSDVOL is freed and is changed to an unused area.

(Step S66) The transfer control section 124 calculates remaining capacity of the SSD after the deletion of the data in step S65 and determines whether or not the calculated remaining capacity of the SSD is larger than or equal to a determined second threshold which is greater than the first threshold. If the remaining capacity of the SSD is smaller than the second threshold, then the transfer control section 124 performs step S63 again. If the remaining capacity of the SSD is larger than or equal to the second threshold, then the transfer control section 124 ends the SSD freeing process.

By performing the above process indicated in FIG. 19, a certain amount (corresponding to the difference between the second threshold and the first threshold) of data, of all data stored on an SSDVOL, is deleted from the SSD in ascending order of access frequency and remaining capacity of the SSD increases.

Another method can be used as a method for deleting data from the SSD. For example, the transfer control section 124 may delete a certain amount of data from an SSDVOL not in ascending order of access frequency but in order of write time. Alternatively, the transfer control section 124 may delete a certain amount of data from the SSD according to SSDVOLs. In this case, for example, the transfer control section 124 deletes a certain amount of data according to SSDVOLs in ascending order of access frequency or in order of write time.

The processing functions of the storage control apparatus in each of the above embodiments can be realized with a computer. In that case, a program in which the contents of the functions each apparatus should have are described is provided. By executing this program on the computer, the above processing functions are realized on the computer. This program can be recorded on a computer readable record medium.

A computer readable record medium may be a magnetic storage device, an optical disk, a magneto-optical recording medium, a semiconductor memory, or the like. A magnetic storage device may be a hard disk drive (HDD), a flexible disk (FD), a magnetic tape, or the like. An optical disk can be a DVD (Digital Versatile Disk), a DVD-RAM (Random Access Memory), a CD-ROM (Compact Disk Read Only Memory), a CD-R (Recordable)/RW (ReWritable), or the like. A magneto-optical recording medium may be an MO (Magneto-Optical disk) or the like. A temporary propagating signal itself is not included in a record medium for recording a program.

To place the program on the market, portable record media, such as DVDs or CD-ROMs, on which it is recorded are sold. Alternatively, the program is stored in advance on a storage unit of a server computer and is transferred from the server computer to another computer via a network.

When the computer executes this program, it will store on its storage unit the program, for example, which is recorded on a portable record medium or which is transferred from the server computer. Then the computer reads the program from its storage unit and performs processes in compliance with the program. The computer can also read the program directly from a portable record medium and perform processes in compliance with the program. Furthermore, each time the program is transferred from the server computer connected thereto via the network, the computer can perform processes in turn in compliance with the program it receives.

In addition, at least a part of the above processing functions can be realized by an electronic circuit such as a DSP, an ASIC, or a PLD.

According to an aspect, the access performance of a storage apparatus can be improved at a low cost in a storage system and a storage control method.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage system comprising:
    a first storage apparatus;
    a second storage apparatus which is faster in access speed than the first storage apparatus; and
    a storage control apparatus
    including a processor configured to perform a procedure including:
    determining, upon receipt of a request to write data to a logical storage area realized by a storage area of the first storage apparatus, whether a write pattern is sequential access or random access;
    writing the data to the logical storage area when the write pattern is the sequential access;
    writing the data to a virtual storage area obtained by virtualizing a storage area of the second storage apparatus when the write pattern is the random access; and
    writing the data written to the virtual storage area to a corresponding position in the logical storage area in asynchronization with writing the data to the virtual storage area.

2. The storage system according to claim 1, wherein the writing to the logical storage area the data written to the virtual storage area includes:
    selecting a divided area, of a plurality of divided areas obtained by dividing the logical storage area, in which a ratio of data written to the virtual storage area to all data is higher than or equal to a determined value, and
    writing the data written to the virtual storage area corresponding to the selected divided area to a corresponding position in the logical storage area.

3. The storage system according to claim 1, wherein the writing to the logical storage area the data written to the virtual storage area includes:
    selecting data, of the data written to the virtual storage area, whose access frequency is lower than or equal to a determined threshold,
    writing the selected data to a corresponding position in the logical storage area, and
    deleting from the virtual storage area the selected data.

4. The storage system according to claim 1, wherein the procedure further includes:
    selecting, when remaining capacity of the second storage apparatus becomes smaller than or equal to a determined threshold, data from the data written to the virtual storage area,
    writing the selected data to a corresponding position in the logical storage area, and
    deleting the selected data from the virtual storage area.

5. The storage system according to claim 1, wherein the procedure further includes reading out, when a request to read out data from the logical storage area is made and all data is stored in the virtual storage area, data from the virtual storage area.

6. The storage system according to claim 5, wherein the procedure further includes:
- detecting access frequency of data written to the logical storage area for each of divided areas obtained by dividing the logical storage area, and
- copying data in a divided area whose access frequency is higher than a determined threshold to the virtual storage area.

7. The storage system according to claim 5, wherein the writing the data to the logical storage area includes overwriting, when the data is already stored in the virtual storage area, the part of the data which is already stored in the virtual storage area with new data.

8. The storage system according to claim 1, wherein:
- the first storage apparatus is provided in plurality;
- the logical storage area is realized by storage areas of the plurality of first storage apparatus; and
- the procedure further includes writing data to the logical storage area so as to store data in different first storage apparatus for realizing redundancy.

9. The storage system according to claim 8 further comprising a third storage apparatus, wherein the writing the data to the virtual storage area includes writing same data to the third storage apparatus.

10. A storage control method comprising:
- determining, by a computer, whether a write pattern is sequential access or random access upon receipt of a request to write data to a logical storage area realized by a storage area of a first storage apparatus;
- writing, by the computer, the data to the logical storage area when the write pattern is the sequential access;
- writing, by the computer, the data to a virtual storage area obtained by virtualizing a storage area of a second storage apparatus which is faster in access speed than the first storage apparatus of when the write pattern is the random access; and
- writing, by the computer, the data written to the virtual storage area to a corresponding position in the logical storage area in asynchronization with writing the data to the virtual storage area.

11. The storage control method according to claim 10, wherein the writing the data written to the virtual storage area to the logical storage area includes:
- selecting a divided area, of a plurality of divided areas obtained by dividing the logical storage area, in which a ratio of data written to the virtual storage area to all data is higher than or equal to a determined value; and
- writing the data written to the virtual storage area corresponding to the selected divided area to a corresponding position in the logical storage area.

12. The storage control method according to claim 10, wherein the writing the data written to the virtual storage area to the logical storage area includes:
- selecting data, of the data written to the virtual storage area, whose access frequency is lower than or equal to a determined threshold,
- writing the selected data to a corresponding position in the logical storage area; and
- deleting from the virtual storage area the selected data.

13. The storage control method according to claim 10, further comprising reading out, by the computer, data from the virtual storage area when a request to read out data from the logical storage area is made and all data is stored in the virtual storage area.

14. The storage control method according to claim 13, further comprising:
- detecting, by the computer, access frequency of data written to the logical storage area for each of divided areas obtained by dividing the logical storage area; and
- copying, by the computer, data in a divided area whose access frequency is higher than a determined threshold to the virtual storage area.

15. The storage control method according to claim 13, wherein the writing the data to the logical storage area includes overwriting, when the data is already stored in the virtual storage area, the part of the data which is already stored in the virtual storage area with new data.

16. The storage control method according to claim 10, wherein:
- the logical storage area is realized by storage areas of the first storage apparatus which is provided in plurality; and
- the storage control method further includes writing data to the logical storage area so as to store data in different first storage apparatus for realizing redundancy.

17. The storage control method according to claim 16, wherein the writing the data to the virtual storage area includes writing same data to a third storage apparatus.

18. A non-transitory computer-readable storage medium storing a storage control program that causes a computer to perform a procedure comprising:
- determining, upon receipt of a request to write data to a logical storage area realized by a storage area of a first storage apparatus, whether a write pattern is sequential access or random access;
- writing the data to the logical storage area when the write pattern is the sequential access;
- writing the data to a virtual storage area obtained by virtualizing a storage area of a second storage apparatus which is faster in access speed than the first storage apparatus when the write pattern is the random access; and
- writing the data written to the virtual storage area to a corresponding position in the logical storage area in asynchronization with writing the data to the virtual storage area.

* * * * *